United States Patent Office 3,591,469
Patented July 6, 1971

3,591,469
PRODUCTION OF LINEAR-TRANS-QUINACRIDONES
Fritz Beck and Rolf Mecke, Ludwigshafen (Rhine), Germany, assignors to Badische Anilin- & Soda-Fabrik Aktiengesellschaft, Ludwigshafen (Rhine), Germany
No Drawing. Filed Sept. 20, 1968, Ser. No. 761,349
Claims priority, application Germany, Sept. 21, 1967,
P 16 70 271.9
Int. Cl. C07b 29/06; C07d 37/18
U.S. Cl. 204—74                          5 Claims

ABSTRACT OF THE DISCLOSURE

A process for the production of linear-trans-quinacridones by electrochemical reduction of the corresponding quinacridonequinones in a cell.

---

This invention relates to a process for the production of linear-trans-quinacridones from the corresponding linear-trans-quinacridonequinones.

Linear-trans-quinacridones are known to be very fast pigment dyes of the red series. They may be prepared in various ways, for example according to a method known from U.K. patent specification No. 979,136 by reduction of the corresponding linear-trans-quinacridonequinones in sulfuric acid with metals such as aluminum, magnesium or zinc. Dihydroquinacridone which is also formed in this reduction is converted into quinacridone by aftertreatment with oxidizing agents such as sodium m-nitrobenzenesulfonate.

Although quinacridones can be prepared in good yields by this prior art method, a considerable excess of metal is necessary because the major portion of the metal used corrodes with evolution of hydrogen. Another disadvantage is the formation of metal salts.

We have now found that the production of linear-trans-quinacridones by reduction of the corresponding quinacridonequinones can be carried out with particular advantage by carrying out the reduction of the quinacridonequinone electrochemically in a cell using 84 to 96% by weight sulfuric acid as solvent at temperatures of from 20° to 100° C. and current densities of 1 to 20 amperes per square decimeter and if necessary aftertreating the reduction products with oxidizing agents.

The course of the reaction in the case of linear-trans-quinacridonequinone may be illustrated by the following equation:

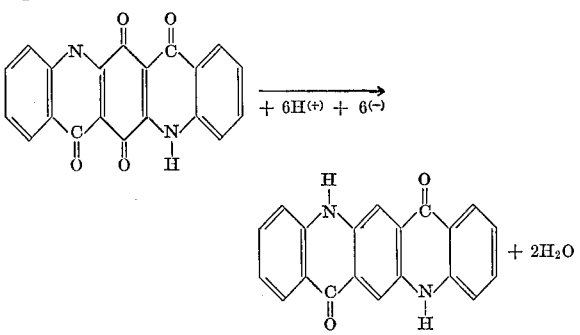

Not only unsubstituted linear-trans-quinacridonequinone but also substituted compounds such as the 2,9-dialkyl, 2,9-dihalogen or 2,9-dimethoxy derivatives of linear-trans-quinacridonequinone are suitable as starting materials. The use of unsubstituted linear-trans-quinacridonequinone is however of particular industrial interest.

The electrochemical reduction of the quinacridonequinone to the corresponding quinacridone is carried out in a conventional electrolytic cell. Cells with diaphragms are particularly advantageous because they prevent anodic oxidation of intermediate products formed by the reduction. Sintered glass or sintered aluminum oxide are examples of suitable materials for the diaphragm. The anodes may consist for example of platinum or platinized titanium. Examples of suitable cathode materials are lead, alloys of lead and mercury, copper, cadmium and particularly mercury. When using a mercury cathode it is advantageous to move the surface of the mercury, for example by making it flow, by stirring or by vibration.

Sulfuric acid which contains from 4 to 16% by weight of water is used as the solvent for the quinacridonequinone to be reduced. It is advantageous to use solutions of quinacridonequinone which are as concentrated as possible. For example if the starting material is unsubstituted linear-trans-quinacridonequinone, the advantageous concentration of quinacridonequinone in the sulfuric acid is from 5 to 10% by weight. The degree of purity of the starting material is not critical. Thus quinacridonequinone of industrial purity may be used. The procedure may be for example that the solutions of quinacridonequinone obtainable by heating 2,5-bis-(2-carboxyanilino)-1,4-benzoquinone in concentrated sulfuric acid at 120° C. are diluted with water and used direct for the new process.

The current density at the cathode is 1 to 20 amperes per square decimeter. The cell voltages thus set up are low because the sulfuric acid in the said concentration range still has an adequate conductance of about 0.1 S/cm. which increases with temperature.

The temperature is kept at from 20° to 100° C., preferably from 60° to 80° C. It is advisable to pass nitrogen into the catholyte during electrolysis. Industrial nitrogen with 1% oxygen is sufficient for the purpose.

During electrolysis the catholyte changes in color from brown through dark green to red violet. The maximum yield is obtained if electrolysis is stopped after a theoretical current conversion of about 100 to 150% calculated for the six-electron reaction formulated above.

The reaction mixture is worked up by a conventional method, for example by pouring the electrolysis discharge on ice, suction-filtering the deposited quinacridone, washing the filtered material and treating it, advantageously in alcoholic-alkaline solution with oxidizing agents such as sodium m-nitrobenzenesulfonate, atmospheric oxygen or sodium polysulfide.

Linear-trans-quinacridone are obtained from quinacridonequinones in yields of about 70% by the new process, corresponding to a current efficiency of 50%. Since concentrated sulfuric acid is readily reduced at a mercury electrode to sulfur dioxide or hydrogen sulfide, it is surprising that quinacridonequinone can be converted at such a good current efficiency into quinacridone according to the new process.

The invention is illustrated by the following examples.

EXAMPLE 1

A cylindrical electrolytic cell of glass is used which contains a pool of mercury as cathode and in which 8 mm. above the cathode there is sintered-glass plate of the same size which is fused into a glass tube which is located coaxially in the cell. Immediately on the other side of the sintered-glass plate there is situated the anode in the form of netting of platinum and rhodium (90% Pt and 10% Rh; 1024 meshes per cm.²). The cell is also fitted with a heating coil, a thermometer, a nitrogen inlet pipe and the leads for the electrodes. Movement of the mercury is brought about by a magnetic stirring rod on the surface of the mercury.

At the beginning of the electrolysis a solution of 15 g. of pure linear-trans-quinacridonequinone in 285 g. of 88% sulfuric acid is placed in the cathode chamber and 100 g. of 88% sulfuric acid in the anode chamber. Electrolysis is carried out at a temperature of 78° C., a current intensity of 1.2 amperes (equivalent to a cathodic current density of 6 amperes/dm.$^2$) while introducing nitrogen. During the electrolysis, the color of the catholyte changes from brown through dark green to red violet. The cell potential is 3.8 to 3.9 volts.

Electrolysis is stopped after 525 minutes, corresponding to a theoretical current conversion of 150%. The reaction mixture is poured onto ice and the precipitated pigment is suction-filtered and washed until neutral. The filter cake is boiled for two hours in a solution of 100 g. of methanol, 20 ml. of water, 20 ml. of 30% aqueous caustic soda solution and 10 g. of sodium m-nitrobenzenesulfonate to reoxidize the content of dihydroquinacridone. The product is suction-filtered, washed until neutral and dried. 10.2 g. of quinacridone is obtained having a purity of 98%. From the data of this example it can be calculated that there is a substance yield of 73% and a mean current efficiency of 49%. The quinacridone may be purified by conventional methods, for example by dissolving it in sulfuric acid and reprecipitating it.

When the electrolysis is carried out at current densities of 10 or 16 amperes/dm.$^2$, similar yields are obtained at cell potentials of 5.2 and 6.5 volts on an average.

EXAMPLE 2

35 g. of 2,5-bis-(2-carboxyaniline)-1,4-benzoquinone (commercial grade) and 400 g. of concentrated sulfuric acid are kept for an hour at 120° C. while stirring. 51 g. of water is dripped into this mixture at room temperature while cooling. Taking into account the water formed by the reaction, a 6.5% solution of quinacridonequinone in 88% sulfuric acid is obtained.

300 g. of this mixture is placed in the cathode chamber of the cell described in Example 1 and electrolysis is carried out at 6 amperes/dm.$^2$ and 78° C. under nitrogen. Electrolysis is stopped after 500 minutes (equivalent to a theoretical current conversion of 110%) and the reaction mixture is worked up as described in Example 1. 13.3 g. of linear-trans-quinacridone having a purity of 97.3% is obtained. From the data of this example it can be calculated that there is a substance yield of 72.5% and a current efficiency of 66%. The quinacridone can be purified by a conventional method, for example by dissolving it in sulfuric acid and reprecipitating it.

We claim:
1. A process for the production of linear-trans-quinacridones which comprises subjecting a linear-trans-quinacridonequinone to electrochemical reduction in a cell using 84% to 96% by weight sulfuric acid as the solvent at a temperature of from 20° to 100° C. and a current density of from 1 to 20 amperes per square decimeter.
2. A process as claimed in claim 1 wherein mercury is used as the cathode material.
3. A process as claimed in claim 1 wherein mercury is used as the cathode material and the surface of the mercury is kept in motion.
4. A process as claimed in claim 1 carried out at a temperature of from 60° to 80° C.
5. A process as claimed in claim 1 wherein any dihydroquinacridone formed is oxidized to the linear-trans-quinacridone.

References Cited

Labana et al., Chemical Reviews, vol. 67, February 1967, pp. 1–18.

F. C. EDMUNDSON, Primary Examiner

U.S. Cl. X.R.

260—279